(12) United States Patent
Na et al.

(10) Patent No.: US 7,800,725 B2
(45) Date of Patent: Sep. 21, 2010

(54) LIQUID CRYSTAL DISPLAY AND SUBSTRATE THEREOF

(75) Inventors: Byoung-Sun Na, Suwon (KR); Jong-Soo Yoon, Cheonan (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 1589 days.

(21) Appl. No.: 09/852,717

(22) Filed: May 11, 2001

(65) Prior Publication Data
US 2001/0040656 A1 Nov. 15, 2001

(30) Foreign Application Priority Data
May 12, 2000 (KR) .............................. 2000-25465

(51) Int. Cl.
*G02F 1/1337* (2006.01)
(52) U.S. Cl. .................. 349/129; 349/110; 349/111; 349/123; 349/130; 349/155
(58) Field of Classification Search ................ 349/123, 349/156, 141, 155, 128, 106, 191, 117, 119, 349/165, 180, 129, 130
See application file for complete search history.

(56) References Cited

U.S. PATENT DOCUMENTS

| | | | | |
|---|---|---|---|---|
| 5,085,973 A | * | 2/1992 | Shimizu et al. | 430/271.1 |
| 5,414,547 A | * | 5/1995 | Matsuo et al. | 359/67 |
| 5,633,739 A | * | 5/1997 | Matsuyama et al. | 349/106 |
| 5,636,042 A | * | 6/1997 | Nakamura et al. | 349/123 |
| 5,654,780 A | * | 8/1997 | Hasegawa et al. | 349/136 |
| 5,689,318 A | * | 11/1997 | Matsuyama et al. | 349/106 |
| 5,739,880 A | * | 4/1998 | Suzuki et al. | 349/110 |
| 5,754,263 A | * | 5/1998 | Akiyama et al. | 349/110 |
| 5,784,133 A | * | 7/1998 | Kim et al. | 349/44 |
| 5,847,793 A | * | 12/1998 | Itoh | 349/110 |
| 5,978,059 A | * | 11/1999 | Ohta et al. | 349/141 |
| 6,169,592 B1 | * | 1/2001 | Choi | 349/124 |
| 6,266,122 B1 | * | 7/2001 | Kishimoto et al. | 349/156 |
| 6,275,273 B1 | * | 8/2001 | Inoue | 349/40 |

(Continued)

FOREIGN PATENT DOCUMENTS

JP 11-185673 * 7/1999

(Continued)

*Primary Examiner*—Kenneth A Parker
*Assistant Examiner*—Anthony Ho
(74) *Attorney, Agent, or Firm*—Innovation Counsel LLP

(57) ABSTRACT

Disclosed is liquid crystal display, a substrate for a liquid crystal display and a method for manufacturing the substrate. The substrate comprises a transparent electrode formed on the insulating substrate, and a black matrix formed on the transparent electrode and performing the function also of protrusions. The method comprises the steps of forming a transparent electrode on a substrate, forming a black matrix layer, depositing a photosensitive material on the black matrix layer to form a photosensitive layer, patterning the photosensitive layer, and etching the black matrix layer using the photosensitive layer as a mask. The liquid crystal display comprises, among other things, redundant data lines formed on a same layer as the pixel electrodes; an insulating second substrate provided opposing the first substrate at a predetermined distance; a common electrode formed on the second substrate; and a protrusion pattern formed on the common electrode in at least regions corresponding to the positions of the redundant data lines, the protrusion pattern being made of an insulating material.

5 Claims, 7 Drawing Sheets

U.S. PATENT DOCUMENTS

| | | | |
|---|---|---|---|
| 6,281,952 B1 * | 8/2001 | Okamoto et al. | 349/112 |
| 6,281,960 B1 * | 8/2001 | Kishimoto et al. | 349/156 |
| 6,410,214 B1 * | 6/2002 | Kim | 430/321 |
| 6,424,402 B1 * | 7/2002 | Kishimoto | 349/156 |
| 6,433,852 B1 * | 8/2002 | Sonoda et al. | 349/156 |
| 6,459,465 B1 * | 10/2002 | Lee | 349/141 |
| 6,476,882 B1 * | 11/2002 | Sakurai | 349/55 |
| 6,476,890 B1 * | 11/2002 | Funahata et al. | 349/113 |
| 6,573,964 B1 * | 6/2003 | Takizawa et al. | 349/129 |
| 6,710,837 B1 * | 3/2004 | Song et al. | 349/143 |
| 6,724,452 B1 * | 4/2004 | Takeda et al. | 349/139 |
| 6,801,293 B1 * | 10/2004 | Nishiyama et al. | 349/187 |
| 7,136,140 B1 * | 11/2006 | Inoue et al. | 349/191 |

FOREIGN PATENT DOCUMENTS

| | | |
|---|---|---|
| KR | 10-2000-0014534 | 3/2000 |

* cited by examiner

LIQUID CRYSTAL DISPLAY AND SUBSTRATE THEREOF

BACKGROUND OF THE INVENTION (a) Field of the Invention

The present invention relates to a liquid crystal display and a thin film transistor substrate for a liquid crystal display.

(b) Description of the Related Art

Liquid crystal displays typically include a first substrate on which are formed a common electrode and a color filter, and a second substrate on which are formed thin film transistors and pixel electrodes. The first and second substrates are provided substantially in parallel with a predetermined gap therebetween, and liquid crystal material is injected between the two opposing substrates. An electric field is formed between the substrates by applying voltages of different potentials to the pixel electrodes and common electrodes. Accordingly, the alignment of liquid crystal molecules of the liquid crystal material varies to control the transmittance of incident light.

However, a serious drawback of LCDs is their limited viewing angle. Various methods and configurations have been developed in an attempt to overcome this problem. In one such method, the liquid crystal molecules are aligned perpendicularly to the first and second substrates, and either a predetermined aperture pattern is formed in or protrusions are formed on the pixel electrodes and the opposing common electrodes. In some instances both a predetermined aperture pattern and protrusions are formed. Such methods are described in various papers including "A New Design to Improve Performance and Simplify the Manufacturing Process of High-Quality MVA TFT-LCD Panels" (Y. Tanaka, et al., 1999 SID, 16.5L) and "Ridge and Fringe-Field Multi-Domain Homeotropic LCD" (A. Lien, et al., 1999 SID, 44.1L).

However, as a result of the additional processes required to form the aperture patterns and protrusions, decreasing the productivity. Accordingly, in the case where protrusions are preferred, there is a need for a method in which apertures can be formed without performing supplementary processes. Further, there is the need for the formation of protrusions that can function to provide all the necessary characteristics for increasing the viewing angle of the LCD.

Another drawback of conventional LCDs is the frequent severing of wiring—gate lines, which transmit scanning signals, and data lines, which transmit image signals—in the thin film transistor substrate when manufacturing the same. To prevent this, redundant wiring is formed. The data wiring forms its redundant wiring by forming a transparent electrode layer, which is provided according to the layout of the data lines, when forming the pixel electrodes. When forming contact holes for the electrical connection between drain electrodes and the pixel electrodes, contact holes are also provided over the data lines. The redundant data wiring is connected to the data lines through these contact holes provided over the data lines.

However, circuits are shorted between the exposed redundant data wiring and the common electrode of the upper substrate if conductive particles come between these two elements. The formation of the aperture pattern or protrusions may cause this problem.

SUMMARY OF THE INVENTION

The present invention has been made in an effort to solve the above problems.

It is an object of the present invention to provide a liquid crystal display and a thin film transistor substrate for a liquid crystal display that does not require supplementary processes in forming protrusions, and short-circuits between the upper substrate and the lower substrate are prevented.

To achieve the above object, the present invention provides a substrate for a liquid crystal display comprising an insulating substrate; a transparent electrode formed on the insulating substrate; and a black matrix formed on the transparent electrode and also performing the function of protrusions.

According to a feature of the present invention, the main protrusions are formed on the black matrix, the main protrusions being realized through a photosensitive layer.

According to another feature of the present invention, the black matrix and the main protrusions are formed in the same pattern through a photolithography process.

According to yet another feature of the present invention, the black matrix is made of chrome.

According to still yet another feature of the present invention, the black matrix is a double layer made of chrome and chrome oxide.

According to still yet another feature of the present invention, the substrate further comprises a color filter formed between the insulating substrate and the transparent electrode.

A method for manufacturing a substrate for a liquid crystal display of the present invention comprises the steps of forming a transparent electrode on a substrate; forming a black matrix layer; depositing a photosensitive material on the black matrix layer to form a photosensitive layer; patterning the photosensitive layer; and etching the black matrix layer using the photosensitive layer as a mask.

According to a feature of the present invention, the black matrix layer is formed on the transparent electrode.

According to another feature of the present invention, a color filter is formed before forming the transparent electrode.

According to yet another feature of the present invention, the black matrix layer is a double layer of chrome and chrome oxide.

The liquid crystal display comprises an insulating first substrate; gate lines formed on the first substrate, the gate lines transmitting scanning signals; data lines insulated from the gate lines and intersecting the same, the data lines transmitting image signals; pixel electrodes formed in regions defined by the intersection of the data lines and the gate lines; redundant data lines formed on a same layer as the pixel electrodes; switching elements connected to the gate lines, the data lines and the pixel electrodes, the switching elements either transmitting or cutting off the transmission of the image signals to the pixel electrodes according to the scanning signals; an insulating second substrate provided opposing the first substrate at a predetermined distance; a common electrode formed on the second substrate; and a protrusion pattern formed on the common electrode in at least regions corresponding to the positions of the redundant data lines, the protrusion pattern being made of an insulating material.

According to a feature of the present invention, the protrusion pattern is an organic black matrix.

According to another feature of the present invention, the liquid crystal display further comprises a black matrix formed between the second substrate and the common electrode.

According to yet another feature of the present invention, the pixel electrodes have an aperture pattern.

According to still yet another feature of the present invention, the protrusion pattern and the aperture pattern of the pixel electrodes divide the pixel electrodes into four domains.

According to still yet another feature of the present invention, the domains are polygonal having two parallel long sides.

According to still yet another feature of the present invention, the domains are classified into first domains with long sides in a first direction and second domains with long sides in a second direction, wherein the first and second directions form an angle of between 85 and 95 degrees.

According to still yet another feature of the present invention, the first direction makes an oblique angle with respect to a side of the pixel electrodes.

According to still yet another feature of the present invention, the liquid crystal display further comprises liquid crystal material injected between the first and second substrates, long axes of liquid crystal molecules of the liquid crystal material being vertically aligned with respect to the first and second substrates in a state where no electric field is generated between the first and second substrates.

According to still yet another feature of the present invention, the liquid crystal display further comprises twisted-nematic liquid crystal material injected between the first and second substrates.

In another aspect, the present invention provides a liquid crystal display comprising an insulating first substrate; a transparent electrode formed on the first substrate; a light-blocking layer formed on the transparent electrode, the light-blocking electrode being made of metal; and a protrusion portion made from an organic layer and aligned with the light-blocking layer.

According to a feature of the present invention, the organic layer is photosensitive.

According to another feature of the present invention, a resistivity of the organic layer is $10^{13} \Omega cm$.

According to yet another feature of the present invention, the liquid crystal display further comprises a second substrate provided opposing the first substrate and on which there are formed a plurality of pixel electrodes and thin film transistors, and wherein the light-blocking layer overlaps areas corresponding to a non-transparent layer of the second substrate, and areas between the pixel electrodes.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Preferred embodiments of the present invention will now be described in detail with reference to the accompanying drawings.

Figure 1:
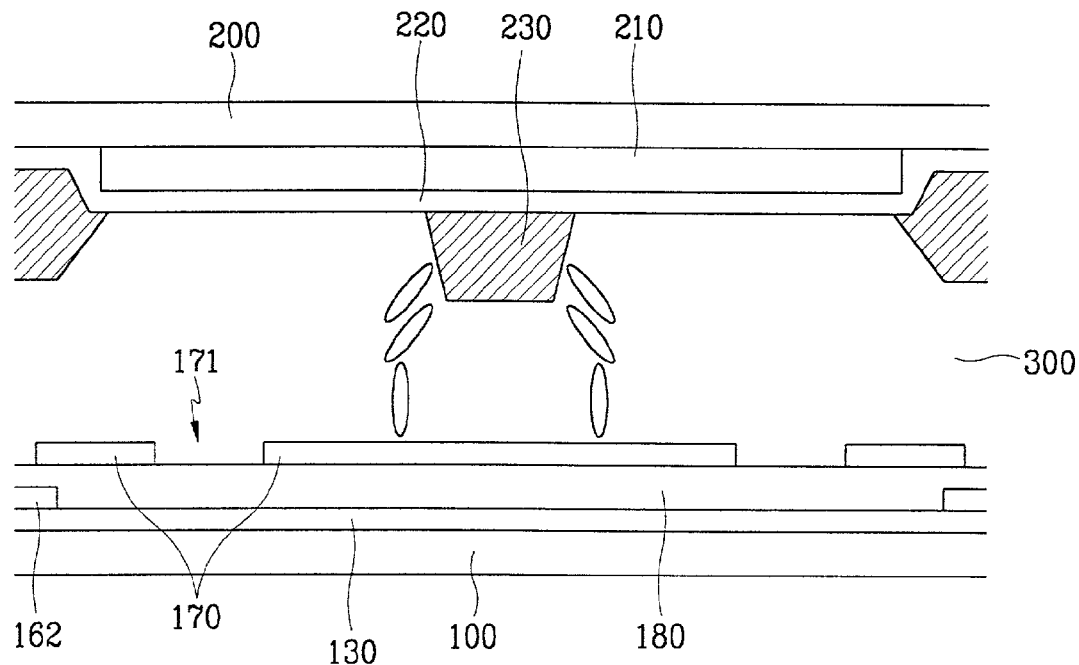
FIG. 1 is a partial sectional view of a liquid crystal display according to a first preferred embodiment of the present invention.

FIG. 1 shows a partial sectional view of a liquid crystal display according to a first preferred embodiment of the present invention. Approximately one unit pixel is shown in the drawing. It is to be assumed that the same structure is repeated over an entire area of the liquid crystal display.

The main elements of the liquid crystal display include an upper substrate 200, a lower substrate 100 and a liquid crystal layer 300. Also included but not shown are a polarizing plate, a compensation plate and a wave guide plate. A description of the elements not shown in the drawing will not be provided herein as they are similar in this structure and operation to those found in conventional LCDs.

Formed on the lower substrate 100 are a gate insulation layer 130, data lines 162, a protection layer 180 and a pixel electrode 170. In addition to these elements but not shown are thin film transistors, gate lines and other elements found on a thin film transistor substrate. Apertures 171 of a predetermined pattern are formed in the pixel electrode 170. The apertures 171 may take on various shapes as long as pixel regions can be divided into a plurality of differing types of small domains together with protrusions of the upper substrate 200 (to be described hereinafter). For example, the apertures 171 may be V or T-shaped. Domain type is determined by a direction of an average director of liquid crystal molecules in the domains.

An RGB color filter 210 is formed on the upper substrate 200 in each pixel region. A common electrode 220, which is made of a transparent conducting material such as ITO (indium tin oxide), is formed over the color filter 210. Also, an organic black matrix 230, which is made of a photosensitive material that contains black pigments such as graphite powder, is formed on the common electrode 220. The black matrix 230 is directly formed into a protrusion pattern. This will be described below with reference to the second embodiment, in which a similar process is used in forming the protrusion pattern. The arrangement and shape of protrusions of the protrusion pattern may vary depending on the apertures 171 of the pixel electrode 170. However, it is preferable that the protrusions are provided such that four or more different types of small domains are formed with the apertures 171.

With the above structure, since the protrusions are formed directly from the black matrix 230, which prevents the leakage of light, additional processes are not required. Further, the apertures 171 are formed simultaneously with the pixel electrodes 170.

Figure 2:
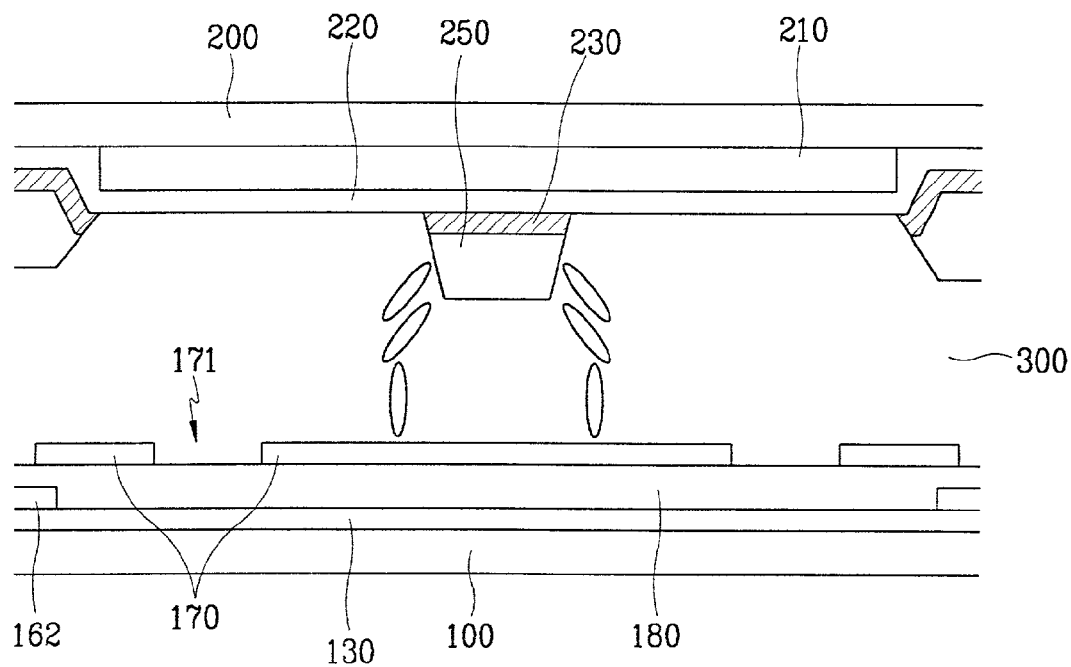
FIG. 2 is a partial sectional view of a liquid crystal display according to a second preferred embodiment of the present invention.

FIG. 2 shows a partial sectional view of a liquid crystal display according to a second preferred embodiment of the present invention. The liquid crystal display of the second embodiment is similar in structure to the first embodiment. Accordingly, like reference numerals will be used for the similar elements. The lower substrate 100 is structured identically as in the first embodiment.

As with the first embodiment, the color filter 210 is formed on the upper substrate 200. Also, the common electrode 220, which is made of a transparent conducting material such as ITO, is formed over the color filter 210. A black matrix 230 is formed over the common electrode 220, the black matrix 230 being made of an inorganic material such as CrOx and Cr or of a photosensitive organic material having included black pigments. If the black matrix 230 is made of a conductor such as chrome, it can take additional advantage of reducing a surface resistance of the common electrode 220. Further, the black matrix 230 made of a double layer of CrOx and Cr improves picture quality by reducing light reflection. When forming the black matrix 230 in such a double layer, it is preferable that a thickness of the Cr is 0.05~0.3 μm and a thickness of the CrOx is 0.03~0.2 μm.

Formed on the black matrix 230 is a photosensitive layer 250. The black matrix 230 and the photosensitive layer 250 are directly formed into a protrusion pattern. This will be described in more detail below. Protrusions of the formed protrusion pattern are provided between the apertures 171 of the pixel electrodes 170. With the formation of the protrusions using the black matrix 230 and the photosensitive layer 250 additional processes are not required. Further, since photosensitive material is highly insulating, the resulting protrusions form separate domains very effectively. If the protrusions are conductive, the electric field formed by applying a voltage between the pixel electrodes 170 and the common electrode 220 is distorted such that overall picture quality is reduced. The resistivity of the photosensitive material is at least $10^{13}$ Ωcm.

Figure 3:
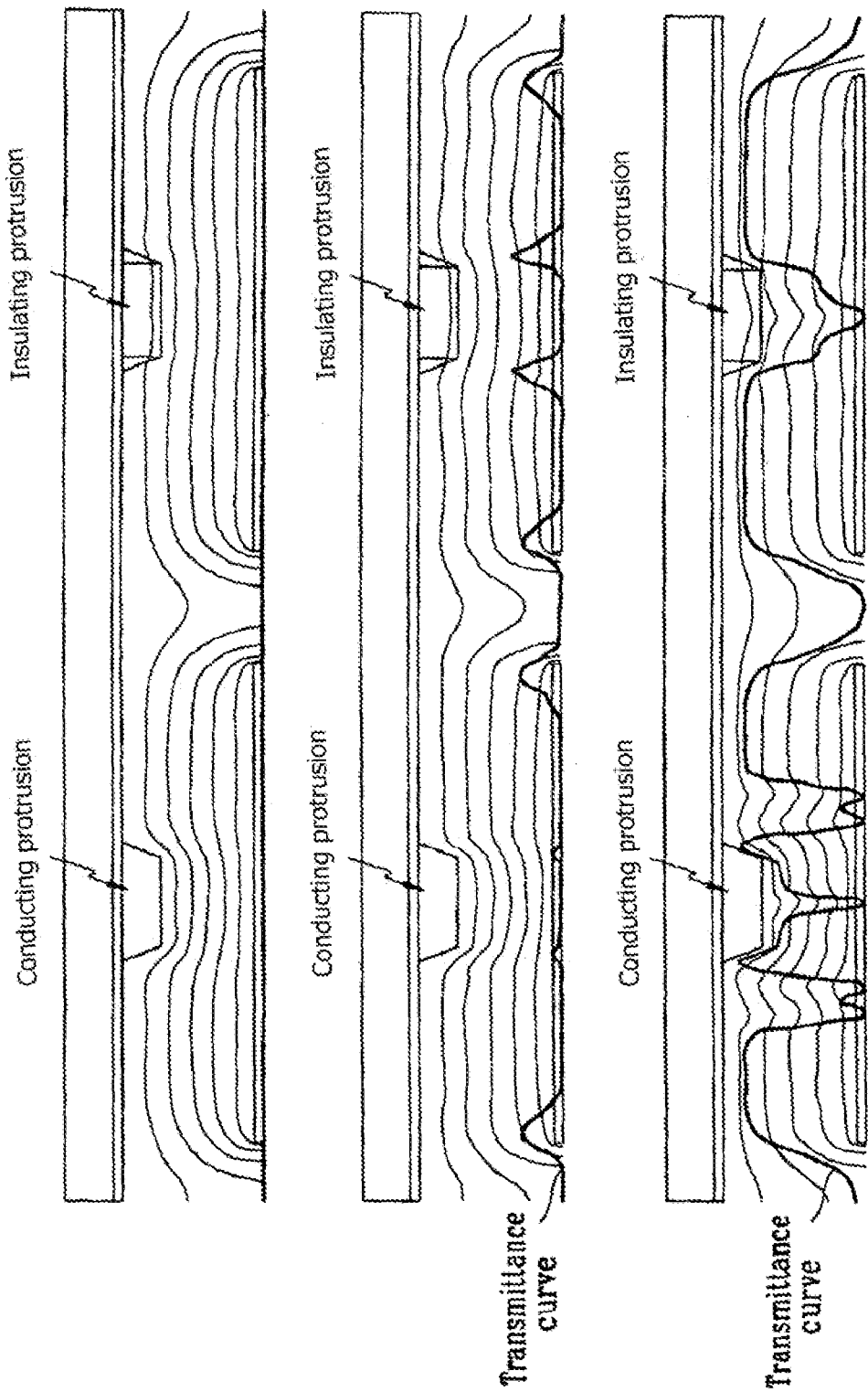
FIG. 3 shows results of an electro-optical simulation in which there are displayed variations in the alignment of liquid crystal molecules with the passage of time and according to whether a protrusion is conductive or insulating.

FIG. 3 shows results of an electro-optical simulation displaying variations in the alignment of liquid crystal molecules with the passage of time and according to whether a protrusion is conductive or insulating.

As shown in FIG. 3, at the area corresponding to the formation of an insulating protrusion, after the application of a voltage and following the passage of a predetermined time, a transmissivity of light is low only in the area of the protrusion while it is high in the remaining areas. However, in the case of the conducting protrusion, after the application of a voltage and following the passage of a predetermined time, the transmissivity of light is low in a large area surrounding the protrusion, thereby generating texture.

Figure 4A:
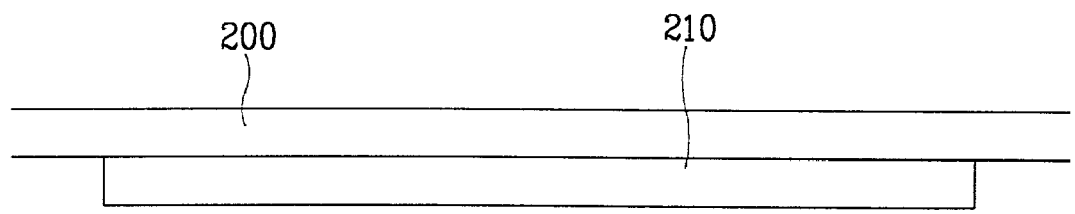
FIGS. 4A, 4B and 4C are sectional views of an upper substrate of the liquid crystal display of FIG. 2 as it undergoes in sequence during manufacture.
Figure 4B:
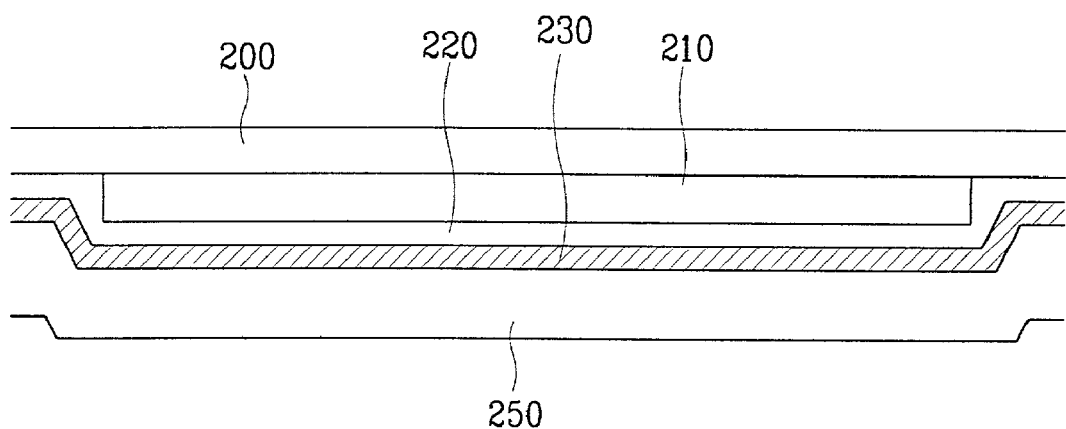
Figure 4C:
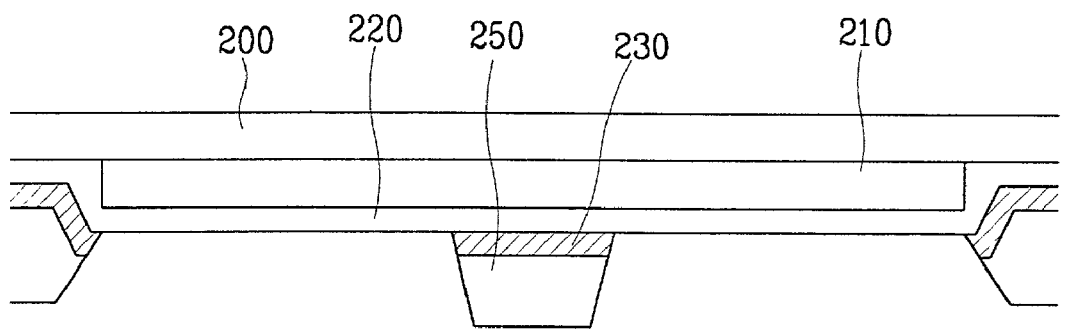

FIGS. 4A, 4B and 4C show sectional views of an upper substrate of the liquid crystal display of FIG. 2 as it undergoes sequential processes during manufacture.

First, with reference to FIG. 4A, the color filter 210 is formed using a screen printing process on the upper substrate 200, which is made of a transparent insulating material such as glass. Next, with reference to FIG. 4B, a transparent conducting material such as ITO is deposited on the color filter 210 to form the common electrode 220. Here, it is possible to first deposit an overcoat layer on the color filter 210 before forming the common electrode 220.

Subsequently, to form the black matrix 230, a Cr single layer or a Cr and CrOx double layer, or a photosensitive layer with black pigment additives is deposited on the common electrode 220. The photosensitive layer 250 is then deposited on the black matrix 230. Finally, with reference to FIG. 4C, the photosensitive layer 250 is exposed and developed to form a predetermined pattern, using a mask. The black matrix 230 is etched using the photosensitive layer pattern as mask. Accordingly, the black matrix 230 and the photosensitive layer 250 are formed in the same protrusion pattern.

In the described manufacturing method the protrusion pattern directly formed from the black matrix 230 and the photosensitive layer 250 eliminates additional processes for providing the protrusions on the upper substrate 200.

Figure 5:
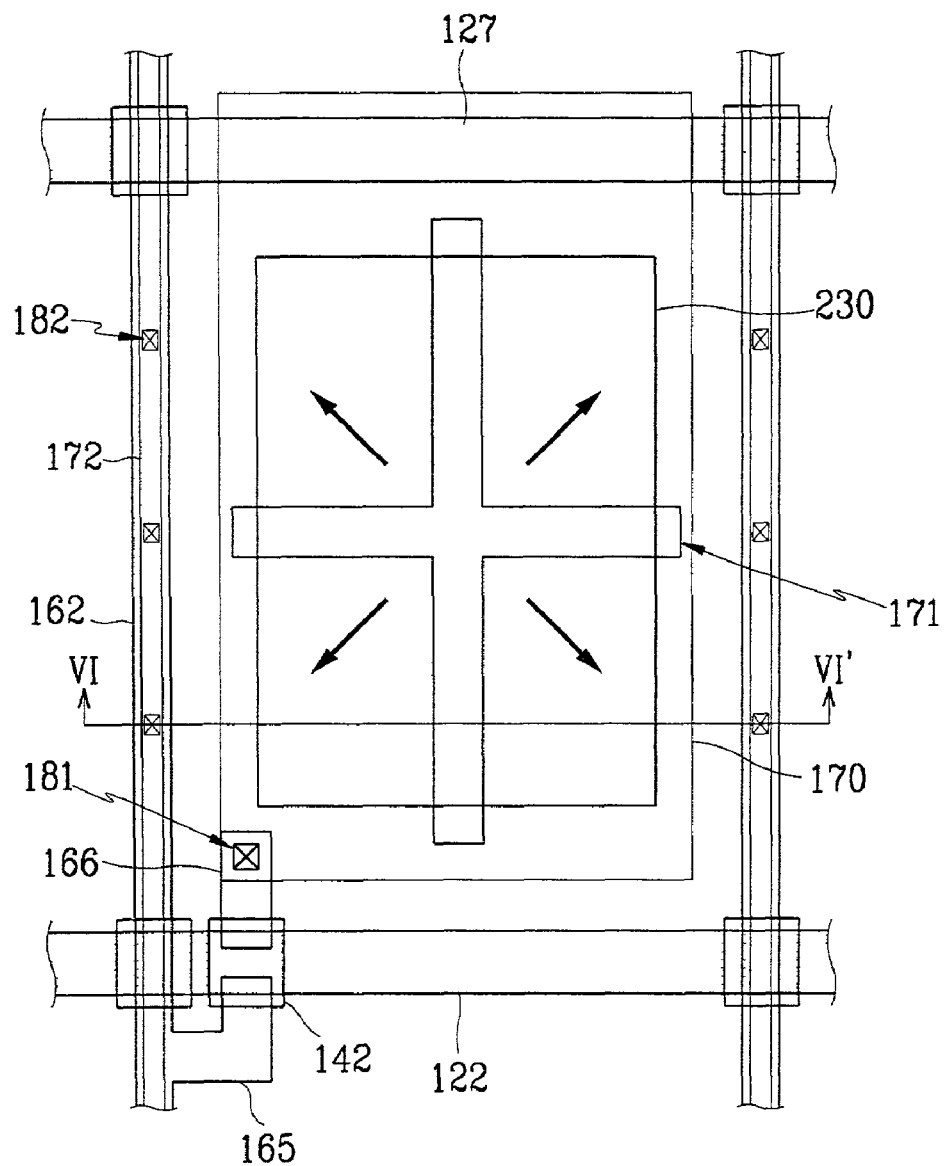
FIG. 5 is a partial schematic plan view of a liquid crystal display according to a third preferred embodiment of the present invention.
Figure 6:
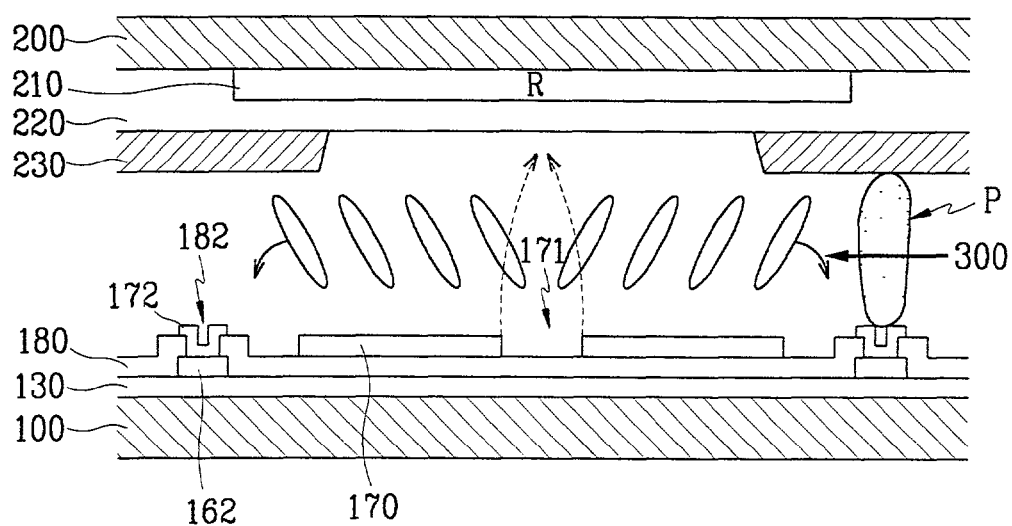
FIG. 6 is a sectional view taken along line VI-VI' of FIG. 5.

FIG. 5 shows a partial schematic plan view of a liquid crystal display according to a third preferred embodiment of the present invention, and FIG. 6 shows a sectional view taken along line VI-VI' of FIG. 5. Approximately one unit pixel is shown in the drawing. It is to be assumed that the same structure is repeated over an entire area of the liquid crystal display.

Formed extending horizontally (in the drawing) on a lower substrate 100 are a gate line 122 and a storage electrode line 127. A gate insulating layer 130 is formed over the gate line 122 and the storage electrode line 127. Formed over the gate insulating layer 130 is a semiconductor layer 142 of a thin film transistor (i.e., a switching element). An ohmic contact layer (not shown) is formed on the semiconductor layer 142. Formed also on the gate insulating layer 130 is a data line 162. Branched from the data line 162 is a source electrode 165, and formed opposing and separated from the source electrode 165 is a drain electrode 166. The source electrode 165 and the drain electrode 166 extend over the ohmic contact layer.

A protection layer 180 is formed over the data line 162, the source electrode 165 and the drain electrode 166. The protection layer 180 includes a contact hole 181 for exposing the drain electrode 166, and contact holes 182 for exposing the data line 162. Formed on the protection layer 180 are a pixel electrode 170, which has an aperture pattern 171, and a redundant data line 172, which is formed in the same pattern as the data line 162 and contacts the data line 162 through the contact holes 182. The redundant data line 172 is formed of the same material as the pixel electrode 170. The aperture pattern 171 of the pixel electrode 170 is formed as two perpendicularly intersecting lines, with the vertical line being substantially parallel to the data line 162. However, the aperture pattern 171 can be formed in various shapes, which will be described hereinafter.

Formed on an inside surface of an upper substrate 200 is an RGB color filter 210, and formed on the color filter 210 is a common electrode 220. The common electrode 220 extends over an entire surface of the upper substrate 200. Also, the common electrode 220 is made of a transparent conducting material such as ITO. Formed on the common electrode 220 is a black matrix 230. The black matrix 230 20 covers at least an area corresponding to the formation of the redundant data line 172. The black matrix 230 acts to provide a variety of functions: preventing the leakage of light; providing, through its formation into protrusions, an alignment direction to liquid crystal molecules; and preventing a shorted-circuit in the redundant data line 172 and the common electrode 220. It is preferable that the black matrix 230 is made of an insulating material with a thickness of 0.1 μm-3 μm. Although the color filter 210 is shown and described formed on the upper substrate 200, it is possible to form the color filter 210 on the lower substrate 100.

Liquid crystal material is injected between the substrates 100 and 200 to form a liquid crystal layer 300. Long axes of liquid crystal molecules comprising the liquid crystal layer 300 are aligned perpendicularly to the substrates 100 and 200 in a state where no electric field is formed between the substrates 100 and 200.

With the liquid crystal display structured as in the above, an electric field generated between the substrates 100 and 200 comes to have a predetermined direction as a result of the aperture pattern 171 of the lower substrate 100 and the protrusions formed using the black matrix 230 of the upper substrate 200. At this time, the protrusions act to vary the shape of the electric field between the protrusions and the liquid crystal layer 300. Further, the protrusions influence the alignment of the liquid crystal molecules at an initial state where no electric field is generated between the substrates 100 and 200. That is, in this state, the liquid crystal molecules in the area of the protrusions are tilted to a certain degree with respect to the substrates 100 and 200.

In each domain, formed by the overlapping of the aperture pattern 171 and the black matrix 230, liquid crystal molecules are tilted to a predetermined direction. If the domains are classified based on a resulting average direction of the long axes of the liquid crystal molecules, total four different domains are formed with the configuration shown in FIG. 5. A wide viewing angle is obtained in all four directions with these small domains. Further, since the insulating black matrix 230 is formed in areas corresponding to the redundant data line 172, a shorted-circuit between the redundant data line 172 and the common electrode 220 is prevented even through a conductive particle P is positioned over the redundant data line 172 as shown in FIG. 6.

Figure 7:
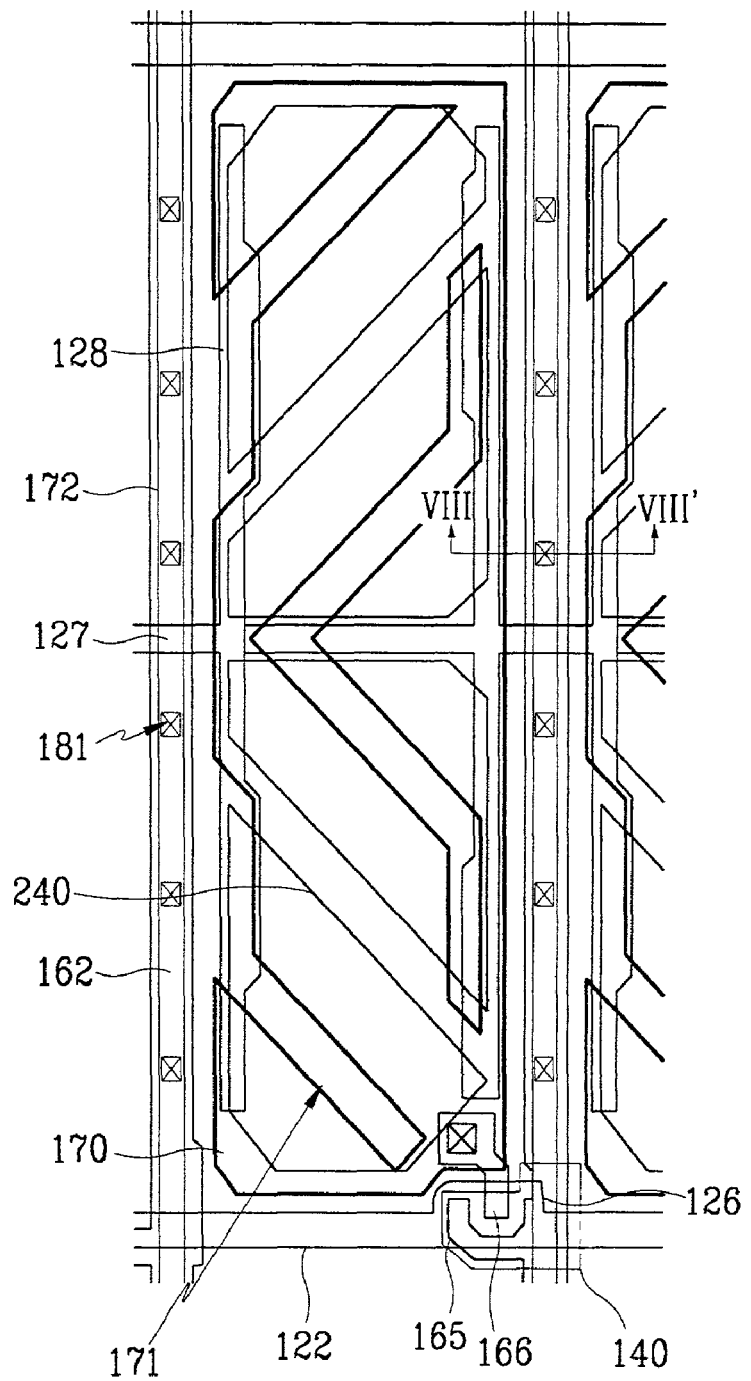
FIG. 7 is a partial schematic plan view of a liquid crystal display according to a fourth preferred embodiment of the present invention.
Figure 8:
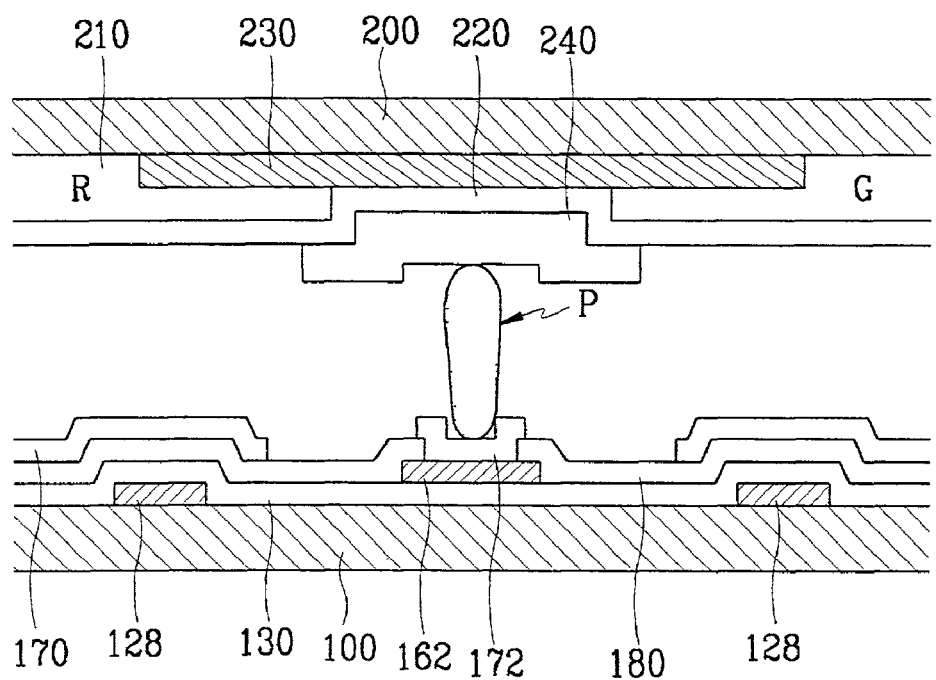
FIG. 8 is a sectional view taken along line VIII-VIII' of FIG. 7.

FIG. 7 shows a partial schematic plan view of a liquid crystal display according to a fourth preferred embodiment of the present invention, and FIG. 8 is a sectional view taken along line VIII-VIII' of FIG. 7. The structure of the fourth embodiment is similar to that of the third embodiment. Accordingly, like reference numerals will be used to denote identical or similar elements.

A lower substrate 100 is identical in structure to the lower substrate of the third embodiment except for the shape of an aperture pattern 171. This will be described in more detail below.

A black matrix 230 is formed on an inside surface of an upper substrate 200, and formed in a pixel region defined by the black matrix 230 is a RGB color filter 210. Formed on the black matrix 230 and the color filter 210 is a common electrode 220, which is made of a transparent material such as ITO. Further, an aperture pattern 240 made of an organic or inorganic insulating material is formed on the common electrode 220. The protrusion pattern 240 covers all of an area corresponding to the formation of a redundant data line 172.

The protrusion pattern 240 of the upper substrate 200 includes a horizontal portion, which divides the pixel electrode 170 of the lower substrate 100 into half of an upper division and a lower division, and a diagonal line portion, which has a plurality of diagonal lines positioned in the lower and upper halves of the pixel electrode 170. If the diagonal lines are extended through imaginary lines until they meet (except for the innermost diagonal lines since these actually connect), substantially a 90-degree angle is formed between diagonal lines in the upper half of the pixel electrode 170 and their corresponding diagonal lines in the lower half of the pixel electrode 170. This configuration results in the uniform dispersing of the slanting direction of the electric field into four directions.

The aperture pattern 171 formed in the pixel electrode 170 includes a diagonal line aperture portion that is formed in the same pattern as the diagonal line portion of the protrusion pattern 240, the diagonal lines of the protrusion pattern 240 being positioned within corresponding locations defined by the diagonal aperture lines of the diagonal line aperture portion; and includes a vertical portion, which is formed uniformly with left and right sides of the pixel electrode 170.

As a result of the above configuration, the protrusion pattern 240 and the aperture pattern 171 of the pixel electrode 170 overlap to divide the pixel electrode 170 into a plurality of small domains. Here, the small domains are polygons having long sides that are parallel to one another. This improves the response time of the liquid crystal molecules. That is, as a result of the slanted electric field formed by the protrusion pattern 240 and the aperture pattern 171, the liquid crystal molecules are aligned uniformly to one another. Accordingly, movement of the liquid crystal molecules into their alignment positions can be performed in a single step, thereby improving the response time.

Further, since the insulating protrusion pattern 240 is formed in areas corresponding to the redundant data line 172, the protrusion pattern 240 prevents the shorted-circuit between the redundant data line 172 and the common electrode 220. This is true even when a conductive particle P comes to be positioned over the redundant data line 172.

In the third and fourth embodiments described above, the structure described is applied to a vertically-aligned LCD in which the liquid crystal molecules are aligned vertically to the substrates, when the electronic field is not applied. However, a twisted-nematic LCD may also prevent the shorted-circuit problem between the redundant data line and the common electrode by forming the black matrix or another insulating material in the area corresponding to the formation of the redundant data line.

In the liquid crystal display and TFT substrate of the present invention described above, additional processes are not required to form the protrusion pattern since existing elements are used directly to realize the protrusion pattern. Further, a shorted-circuit between the redundant data line and the common electrode can be prevented, since the black matrix or another insulating material is formed in the area corresponding to the formation of the redundant data line. This also ensures a wide viewing angle.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A substrate for a liquid crystal display, comprising:
   an insulating substrate having a flat surface;
   a color filter disposed on the insulating substrate;
   a transparent electrode disposed on the color filter; and
   a black matrix disposed on the transparent electrode;
   a protrusion disposed on the black matrix and comprising a photosensitive material,
   wherein the transparent electrode is disposed below the black matrix and above the color filter.

2. The substrate of claim 1, wherein the black matrix and the protrusion are formed by a single photolithography process.

3. The substrate of claim 1, wherein the black matrix comprises chrome.

4. The substrate of claim 1, wherein the black matrix comprises two layers respectively comprising chrome and chrome oxide.

5. The substrate of claim 1, wherein the protrusion contacts the black matrix.

* * * * *